United States Patent [19]

Pruett et al.

[11] Patent Number: 4,745,174
[45] Date of Patent: May 17, 1988

[54] POLYESTERS HAVING IMPROVED WHITENESS

[75] Inventors: Wayne P. Pruett, Kingsport; Samuel D. Hilbert, Jonesborough; John G. Thompson; Max A. Weaver, both of Kingsport, all of Tenn.

[73] Assignee: Eastman Kodak Company, Rochester, N.Y.

[21] Appl. No.: 41,512

[22] Filed: Apr. 23, 1987

[51] Int. Cl.$^4$ .................. C08G 69/44; C08G 73/16
[52] U.S. Cl. .................... 528/289; 524/89; 524/602; 528/274; 528/308.2; 546/76
[58] Field of Search .............. 524/89, 602; 528/274, 528/289, 308.2; 546/76

[56] References Cited

U.S. PATENT DOCUMENTS

| | | | |
|---|---|---|---|
| 2,756,234 | 7/1956 | Elslager | 546/76 |
| 3,324,131 | 6/1967 | Genta | 546/76 |
| 3,678,053 | 7/1972 | Boffa et al. | 546/76 |
| 3,980,609 | 9/1976 | Neeff et al. | 524/89 |

Primary Examiner—Lucille M. Phynes
Attorney, Agent, or Firm—John F. Stevens; William P. Heath, Jr.

[57] ABSTRACT

This invention relates to novel fiber forming polyester compositions that exhibit improved whiteness by incorporating derivatives of dibenzoisoquinolinediones of the formula

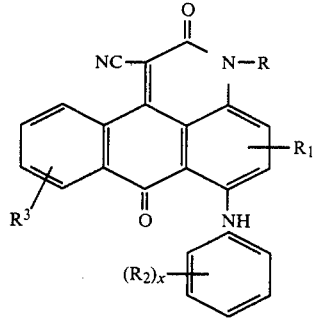

wherein
R is hydrogen, cycloalkyl, allyl, alkyl, aralkyl, alkoxyalkyl or cycloalkylalkylene;
$R_1$ is hydrogen, halogen, alkyl, alkoxy, aryloxy, alkylthio or arylthio;
$R_2$ is hydrogen, halogen, alkyl, aryl, alkoxy, aryloxy, alkylthio, arylthio, carbalkoxy, carbaryloxy, carbaralkyloxy, carboxy, sulfamoyl, alkylsulfamoyl, dialkylsulfamoyl, alkylarylsulfamoyl, cycloalkylsulfamoyl, arylsulfamoyl, carbamoyl, alkylcarbamoyl, dialkylcarbamoyl, alkylarylcarbamoyl, cycloalkylcarbamoyl, arylcarbamoyl, 2-pyrrolidono, acylamido or N-alkylacylamido;
$R_3$ is one or more groups selected from the group consisting of hydrogen, halogen, alkyl, and alkoxy; and
x is an integer of 1 to 5;
wherein one or more alkyl, alkoxy, aryl, aryloxy, alkylthio, arylthio or aralkyl residues may contain one or more reactive groups selected from the group consisting of carboxy, carbalkoxy, carbaryloxy, N-alkyl-carbamoyloxy, carbamoyloxy, acyloxy, chlorocarbonyl, hydroxyl, cycloalkylcarbonyloxy, N-arylcarbamoyloxy, and N,N-dialkylcarbamoyloxy wherein said alkyl and aryl groups may also have common substituents such as alkoxy, acyloxy, cyano, halogen, hydroxy and acylamido.

11 Claims, No Drawings

POLYESTERS HAVING IMPROVED WHITENESS

FIELD OF THE INVENTION

This invention relates to new fiber-forming or molding grade polyester compositions that exhibit improved apparent whiteness by incorporating therein derivatives of dibenzoisoquinolinediones.

BACKGROUND OF THE INVENTION

It is well known that polymeric polyesters prepared by polycondensation of a dihydric alcohol or its functional derivatives and a dicarboxylic acid or a polyester forming derivative thereof such as an acid halide, or a simple diester of a dibasic acid and a volatile monohydric alcoholic, are excellent fiber forming or moldable polymers.

Commercially, the most important polyesters are those prepared by the condensation of terephthalic acid or dimethylterephthalate and a polymethylene glycol containing from 2 to 10 carbon atoms, and more particularly ethylene glycol, 1,4-cyclohexandeimethanol or mixtures thereof.

These polyesters are relatively inert and hydrophobic materials which are capable of being formed into filaments which can be drawn to produce textile fibers of superior strength and pliability.

Unfortunately, because of their compact molecular structure, polyesters, and in particular polyethylene terephthalate, are difficult to dye or otherwise color after the polymer has been formed into a fiber or molded shape.

As a result, a substantial body of art has developed in the modification of polyesters to improve their receptivity to dyes and color modifying compounds.

A desirable feature of polymer materials in many instances is an appearance of whiteness. For instance, it is often desired that a fabric manufactured from polyester fiber present the appearance of whiteness to the observer. Unfortunately, native polyester fiber as manufactured has a yellowish appearance unacceptable to the observer.

At the present time, in order to improve the apparent whiteness in polyester materials, toners are incorporated into the polyester to hide the yellow color. Such toners usually have a visible absorption maximum in the range of 575 nm to 595 nm as measured in acetone.

Cobalt acetate is one of the most widely used toners in the industry to mask the yellow color of polymers. However, cobalt acetate has a number of disadvantages. For instance, cobalt acetate toner materials tend to be unstable during storage as the result of temperature and humidity, and undergo an undesirable color shift toward yellow. Hence, when high cobalt concentrations are needed to mask the yellow color of some polymers there is a tendency to impart a grey color to the polymer.

Another disadvantage is the limitation by certain regulatory bodies of the level of cobalt usable in polyester catalyst systems.

In addition, cobalt lowers polymer thermal stability and increases acetaldehyde formation in poly(ethylene terephthalate).

Lastly, cobalt has a strong tendency to form insoluble residues in manufacturing process equipment, leading to manufacturing quality control problems.

In addition to overcoming the disadvantages of cobalt acetate as a toner for polyesters, an improved toner must be stable under the conditions of polymerization and melt processing. The toner must be stable to light and to other environmental conditions to which the fiber, fabricated article prepared therefrom may be exposed. An improved toner must be readily incorporated into a polyester without deleteriously affecting the physical properties of the polymer.

Thus, there still is a continuing need for polyesters having improved whitness.

SUMMARY OF THE INVENTION

It is, therefore, an object of this invention to provide polyesters having improved apparent whiteness and thermal and light stability by incorporating therein novel toners.

A further object of this invention is to provide an improved process for producing such polyesters.

The present invention provides polyesters having incorporated therein small amounts of substituted 1-cyano-3H-dibenzo [f,ij] isoquinoline-2,7-diones having the following structural formula

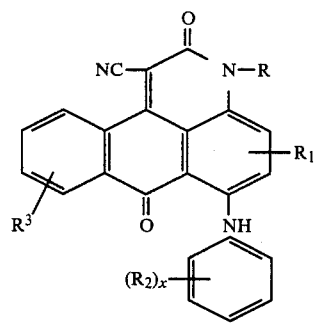

wherein
R is hydrogen, cycloalkyl, allyl, alkyl, aralykyl, alkoxyalkyl or cycloalkylalkylene;
$R_1$ is hydrogen, halogen, alkyl, alkoxy, aryloxy, alkylthio, or arylthio;
$R_2$ is hydrogen, halogen, alkyl, aryl, alkoxy, arylalkoxy, alkylthio, arylthio, carbalkoxy, carbaralkoxy, carboxy, sulfamoyl, alkylsulfamoyl, dialkylsulfamoyl, alkylarylsulfamoyl, cycloalkylsulfamoyl, arylsulfamoyl, carbamoyl, alkylcarbamoyl, dialkylcarbamoyl, alkylarylcarbamoyl, cycloalkylcarbamoyl, arylcarbamoyl, 2-pyrrolidono, acylamido or N-alkylacylamido;
$R_3$ is one or more residues selected from the group consisting of hydrogen, halogen, alkyl and alkoxy;
x is an integer of 1 to 5;
wherein one or more alkyl, alkoxy, aryl, aryloxy, alkylthio, arylthio or aralkyl groups may contain one or more reactive residues selected from the group consisting of carboxy, carbalkoxy, carbaryloxy. N-alkylcarbamoyloxy, carbamoyloxy, acyloxy, chlorocarbonyl, hydroxyl, cycloalkylcarbonyloxy, N-arylcarbamoyloxy and N,N-dialkylcarbamoyloxy, wherein said alkyl and aryl groups may further contain substituents such as alkoxy, acyloxy, halogen, cyano, hydroxy and acylamido.

The compounds of the present invention may be prepared by a modified Ullmann reaction involving nitrogen arylation of aniline in the presence of copper catalysts according to the reaction

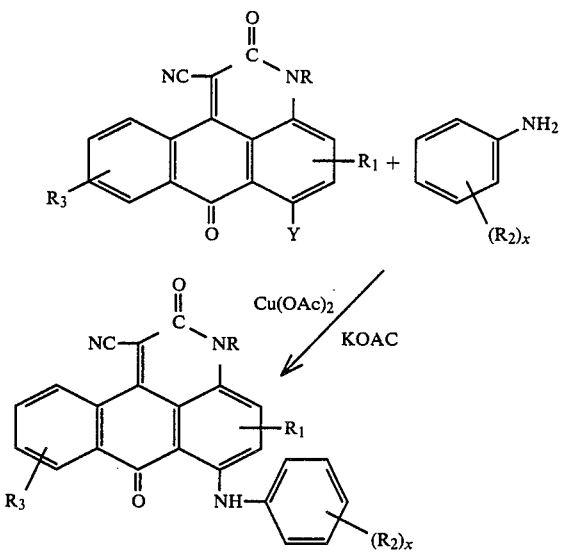

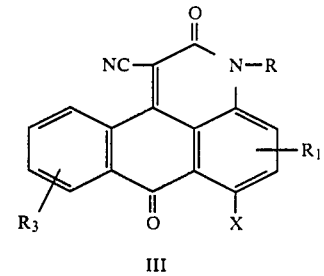

III to give 1-(chloroacetamido)-4-halogenoanthraquinone (II), which is then ring-closed to halogenated dibenzoisoquinolinedione (III) by treatment with alkali metal cyanides such as potassium cyanide.

Suitable polyesters of this invention are those having recurring units of the formula $$-\overset{O}{\underset{\|}{C}}-A-\overset{O}{\underset{\|}{C}}-O-B-O-$$

wherein A is selected from the group consisting of

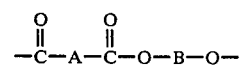, 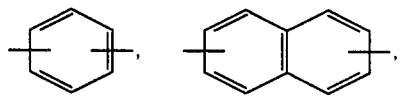,

,

and branched or linear alkylene radicals containing from 2–10 carbon atoms, where Z is selected from the group consisting of branched or linear ($C_1$–$C_4$) alkylenes, —O—, —S—, and —$SO_2$—.

Typical radicals include those derived from terephthalic acid, isophthalic acid, p,p'-dicarboxylbiphenyl, p,p'dicarboxydi-phenylsulfone, p,p'-dicarboxydiphenylmethane, and aliphatic, cycloaliphatic and aryl esters and half esters thereof, ammonia and amine salts thereof, and acid halides thereof and the like. Examples of such alkylene radicals are those derived from succinic and adipic acid.

B is a divalent radical selected from the group consisting of brached or linear ($C_2$–$C_{10}$) alkylenes and ($C_5$–$C_{10}$) cycloalkylenes such as radicals derived from a glycol of the series HO($CH_2$)$_n$OH, wherein n is an integer from 2 to 10, or cycloaliphatic glycols.

Polyesters of the present invention are prepared by either batch or continuous processes. The polyesters may be prepared by reaction between dihydric alcohols and dibasic acids, esters, acid chlorides or anhydrides. Typically, a dibasic acid ester is prepared from a dibasic acid and a volatile alcohol.

To prepare the polyester of the invention, one or more such dibasic acid esters or anhydrides is reacted with an excess of one or more dihydric alcohols in the presence of a suitable transesterification catalyst and wherein Y is halogen and R, $R_1$, $R_2$, $R_3$ and x are as defined hereinbefore.

Typically, the reaction is carried out in the presence of catalytic amounts of a copper salt and a suitable base. The halogen-substituted isoquinolinedione reacts with the aniline amino moiety forming the anilino derivative of the dibenzoisoquinolinedione which is recovered and purified by conventional techniques involving solvent removal, filtration and recrystallization.

While the aniline compounds employed as the starting material are well known and commercially available, the halogenated dibenzoisoquinolinediones are prepared, in general, by the following method as described by Allen, C. F. H., et al, JACS:585-588 (1950).

An intermediate 1-amino-4-halogenoanthraquinone I is reacted with chloroacetyl chloride or chloroacetic anhydride

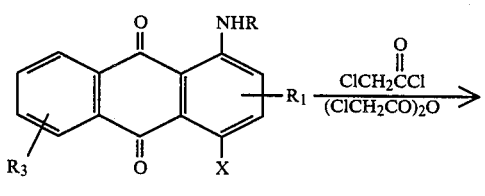

X = Cl, Br, etc.
I

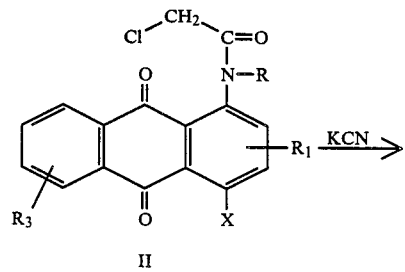

II one or more of the described dibenzoisoquinolinedione compounds. The reactants are heated to evolve the volatile alcohol followed by polymerization by polycondensation, generally at elevated temperatures and low pressures.

The preferred 1-cyano-3H-dibenzo [f,ij] isoquinoline - 2, 7 diones of the instant invention are those illustrated by the formula

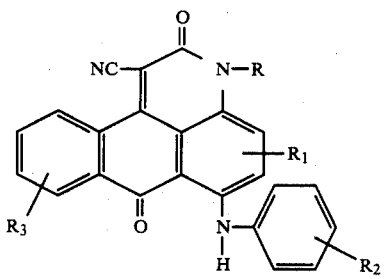

wherein R is methyl, $R_1$ is hydrogen, $R_3$ is hydrogen and $R_2$ is 4'-(2 hydroxyethyl).

Another preferred toner of the instant invention is that compound wherein R is methyl, $R_1$ is hydrogen, $R_3$ is hydrogen and $R_2$ is 4'-(2-hydroxyethoxy).

The more preferred compounds incorporated as toners in the present invention usually exhibit a visible absorption maximum in the range of about 575 nm to 595 nm in acetone. An absorption maximum in this range corresponds to the correct spectral characteristics needed to hide the yellow color of polyester, as manufactured.

In addition to these desirable absorption characteristics, the compounds are stable under the heat generated by the polymerization. They are also stable to light and other environmental effects and impart no abrasive characteristics to the polymer in which they are incorporated.

The cyanodibenzoisoquinolinedione compounds of the invention are described in co-filed U.S. application Ser. No. 41,573, filed Apr. 23, 1987 entitled "Novel Substituted Isoquinolines," by the present inventors. The entire content of the co-filed application is incorporated herein by reference.

The substituted cyanodibenzoisoquinolinedione compounds of this invention are incorporated into polyesters either by copolymerization or admixture with the polyester polymer.

Preferred compounds are those containing 1 or 2 esterifiable groups which react in an esterification or transesterification reaction to form an ester having the toner molecule incorporated in the structure of the polyester molecule.

When the compound contains two esterification reactive groups or a functionality of 2, the molecule is then a comonomer when added to a polyester polymerization reaction and is incorporated in the backbone of the polyester molecule.

When the toner molecule has one esterification reactive group or a functionality of one, the toner molecule will function as a chain terminating group when added to the polyester polymerization reaction and is incorporated in the polyester structure as a terminal group on the polyester molecule.

In each instance, the toner molecule is bonded to the polymer molecule through the primary valence forces of an ester bond.

Where the toners of this invention do not contain an esterifiable reactive group, they may be incorporated into the polyester by mixing, either during the course of the polymerization reaction, by melt mixing with the polyester using conventional apparatus such as a two roll mill, or by mixing with molten polyester during fiber spinning operations.

A distinguishing feature of the polyesters of the present invention incorporating the toners described herein is that the toners which are added either as part of the polymer structure or as mixtures therein, do not degrade the desirable physical and chemical properties of polyester materials.

It is a common problem that the inclusion of a comonomer or a chain terminating compound in a polyester polymerization reaction adversely affects the physical properties such as melting point or tensile strength of the polyester as compared to the unmodified polymer.

It is also well known that chain terminators, by the mechanism of their reaction, may lower the average molecular weight of the polymer system leading to less than maximum physical and chemical properties for the polyesters derived therefrom.

The cyanodibenzoisoquinolinedione compounds are incorporated in the polyester in amounts sufficient to improve the apparent whiteness of the polymer.

Normally less than 10 parts per million based on the weight of polyester are necessary. Consequently, when added in such small amounts, the compounds have a negligible effect on the average molecular weight of the polyester and the physical and chemical properties associated therewith.

This desirable feature of the toners of this invention is an inherent part of their chemical structure which exhibits an absorptivity sufficiently strong to confer apparent whiteness on a polyester polymer even when employed in very small amounts.

Other objects, advantages and features of the present invention will become apparent to those skilled in the art from the following discussion.

DESCRIPTION OF THE PREFERRED EMBODIMENTS

Among the polyesters and copolyesters useful in the instant invention are those resulting from reacting one or more of the glycols of the series $HO(CH_2)_nOH$, wherein n is an integer from 2 to 10, cycloaliphatic glycols with one or more dicarboxylic acids, or ester forming derivatives thereof.

Among the dicarboxylic acids and ester forming derivatives thereof which are useful in the present invention, there may be named terephthalic acid, isophthalic acid, 2,6-naphthalenedicarboxylic acid, p,p'-dicarboxydiphenyl, p,p'-dicarboxydiphenylsulphone, p,p'-dicarboxyldiphenylmethane, 1,4-cyclohexanedicarboxylic acid, 1,3-cyclohexanedicarboxylic acid, succinic acid, glutaric acid, adipic acid, 1,12-dodecanedioic acid and aliphatic and aryl esters, half esters and acid halides of the above named compounds.

Examples of the polyhydric alcohols which may be employed in practicing the instant invention are ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, diethylene glycol, triethylene glycol, dipropylene glycol or tripropylene glycol; and x,8-bis (hydroxymethyl) tricyclo [5.2.1.0]-decane wherein x represents 3, 4, or 5.

The preferred polyesters of the present invention acid moiety comprises at least 50 mole percent of the residue of terephthalic acid and a diol moiety comprising at least 50 mole percent of a mixture of ethylene glycol and 1,4-cyclohexanedimethanol.

Another preferred polyester of the instant invention is one wherein the polyester comprises a polyester of a diol comprising 1,4-cyclohexanedimethanol and a dibasic acid comprising terephthalic acid or ester thereof. Yet another preferred polyester is one wherein the diol includes up to 50 mole percent of ethylene glycol.

More preferred polyesters of the present invention are linear polymers exhibiting thermoplastic characteristics and, in general, have an inherent viscosity (I.V.) of about 0.4 to about 1.2 deciliters per gram.

All of the preferred polyesters incorporate toners of the instant invention in an amount between about 0.5 to about 10 parts per million based on the weight of polymer.

The preferred method for preparing polyesters incorporating toners of the instant invention is by ester interchange. This is the exchange of an ester such as dimethylterephthalate. One or more glycols such as ethylene glycol, suitable catalysts and less than 10 parts per million of toner. The compounds are charged to a reactor and heated at about 200° C. and 225° C. under a nitrogen atmosphere.

This first stage of the reaction produces the bisglycolate of the dibasic acid which, without further separation, is employed in the second stage to produce the polyester.

After the ester interchange reaction, a catalyst-inhibitor such as a phosphate ester is added to the reaction product and the reaction product is polycondensed. The preferred phosphate ester has the formula

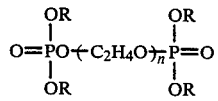

wherein
n has an average value of 1.5 to about 3.0, with about 1.8 being most preferred; and
each R is hydrogen or an alkyl radical having from 6 to 10 carbon atoms, with octyl being most preferred, the ratio of the number of R groups of hydrogen atoms to the number of phosphorus atoms being about 0.25 to 0.50, with about 0.35 being most preferred and the ester having a free acidity equivalent of about 0.2 to 0.5.

The ester is present in an amount to provide 13–240 parts of phosphorus per million based on the acid fraction of the polyester to be produced.

Other phosphate esters useful in this invention include ethyl acid phosphate, diethyl acid phosphate, triethyl acid phosphate, arylalkyl phosphates, tris-2-ethylhexyl phosphate and the like. Preferred phosphate esters are those described in U.S. Pat. No. 3,962,189.

In the second stage, the reaction is conducted at a sufficiently reduced pressure so as to allow polycondensation to take place at the reaction temperature employed. Reduced pressure is utilized to remove the free polyhydric alcohol which is volatilized under these conditions and removed from the system.

The polyester resulting from the polymerization process of this invention is water clear with a desirable, very slight blue tint as compared to a polyester prepared without a blue toner which exhibits an undesirable yellow color.

Having now generally described this invention, the same will be better understood by reference to certain specific examples, which are included herein for purposes of illustration only and are not intended to be limiting of the invention or any embodiment thereof, unless so specified.

The following examples are included to serve to further illustrate the invention. It will be understood that the examples given are by way of exemplification only and are not to be considered as limiting the scope of the invention.

EXAMPLES

Example 1

Preparation of 1-cyano-6-[4'-(2-hydroxyethyl) anilino]-3-methyl-3H-dibenzo [f,ij] isoquinoline-2,7-dione A mixture of 6-bromo-1-cyano-3-methyl-3H-dibenz [f,ij] isoquinoline-2,7-dione (2.0 g), p-aminophenylethanol (15 g), potassium acetate (2.0 g), cupric acetate (0.2 g) and butanol (10 mL) is heated gradually to about 80° C., held for 5–10 minutes, and then drowned into 250 mL of 10% HCl.

The solid product is collected by filtration, washed with water, dried in air, and recrystallized twice from nitrobenzene to remove a red impurity and traces of starting material.

A yield of 0.65 g of product, which has a visible absorption maximum at 587 nm in acetone, is obtained, thus imparting a reddish-blue color to acetone. The structure of the compound is as follows.

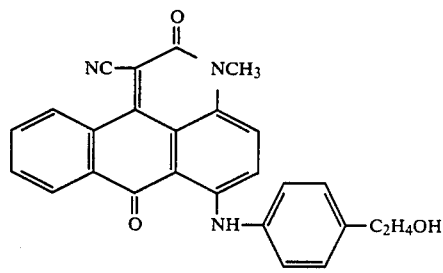

Example 2

Preparation of 1-cyano-6-[4'-(2-hydroxyethoxy) anilino]-3-methyl-3H-dibenzo [f,ij] isoquinoline-2,7-dione A mixture of 6-bromo-cyano-3-methyl-3H-dibenzo [f,ij] isoquinoline-2,7-dione (2.0 g), p-aminophenoxyethanol (10.0 g), potassium acetate (2.0 g), cupric acetate (0.5 g), and n-butanol (25 mL) is heated and stirred at steam bath temperature for 1 hour.

The warm reaction mixture is drowned into acetone (200 mL) and the solid collected by filtration, washed with acetone, and slurried in 150 mL of 10% HCl at about 60° C. with stirring.

After being collected by filtration, the dye is washed with hot water and then methanol followed by drying in air. Recrystallization from nitrobenzene yields 0.6 g of essentially pure blue toner having the following structure.

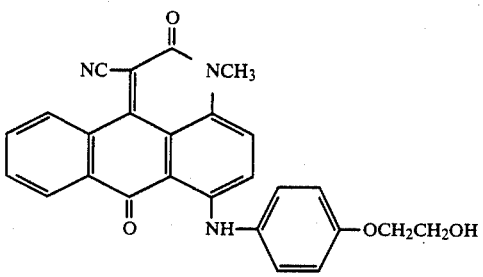

Example 3

Preparation of Poly(ethylene terephthalate) Copolymerized with 30 Mole % 1.4-cyclohexane-dimethanol and 4 ppm of 1-cyano-6[4'-(2-hydroxyethoxy) anilino]-3-methyl-3H-dibenzo [f,ij] isoquinoline-2,7-dione Blue Toner The compounds below are placed in a 500 mL, single-necked, round-bottom flask.
97 g (0.5 m) dimethylterephthalate,
23 g (0.16 m) 1,4-cyclohexanedimethanol (70% trans isomer).
52.1 g (0.64 m) ethylene glycol,
0.22 mL of a n-butanol solution of acetyl triisopropyl titanate containing 0.0066 g titanium.
1.25 mL of an ethylene glycol solution of Mn(OCOCH$_3$)$_2$.4H$_2$O containing 0.006 g manganese, and
4 mL of an acetone solution containing 0.000436 g (4 ppm) of 1-cyano-6[4'-(2-hydroxyethoxy) anilino]-3-methyl-3H-dibenzo [f,ij] isoquinoline-2-7-dione blue toner.

The flask is equipped with a nitrogen inlet, metal stirrer, vacuum outlet, and condensing flask. The flask and contents are heated at 200° C. in a Belmont metal bath for 60 minutes and at 225° C. for 80 minutes with a nitrogen sweep over the reaction mixture while the ester interchange takes place.

After the ester interchange reaction, the phosphate ester (A) described above is added to the reaction product in an amount to provide about 125 parts per million of phosphorus based on the final theoretical polymer weight and the reaction product is polycondensed.

The metal bath temperature is increased to 278° C. Vacuum is applied to the flask. The flask and contents are heated at 278° C. for 60 minutes with a pressure of 0.2 to 0.5 mm Hg to allow polycondensation to take place. The flask is removed from the metal bath and allowed to cool in a nitrogen atmosphere.

The resulting amorphous polymer is water clear with a desirable, very slight blue tint (the polyester prepared with no blue toner is yellow colored).

The resulting polymer has an inherent viscosity of 0.77 measured in a 60/40 ratio by weight of phenol-tetrachloroethane at a concentration of 0.5 g per 100 mL.

Gas chromatographic analyses of a hydrolyzed sample of the polyester show that the polyester contains 30 mole % of 1,4-cyclohexanedimethanol.

Example 4

Preparation of Poly(1,4-cyclohexylenedimethylene terephthalate) Copolymerized With 37 Mole % Ethylene Glycol and 4 ppm of 1-Cyano-6-[4'-(2-hydroxyethyl) anilino[-3-methyl-3H-dibenzo [f,ij] isoquinoline-2, 7-dione Blue Toner The compounds below are placed in a 500 mL, single-necked, round-bottom flask.
97 g (0.5 m) dimethyl terephthalate,
49 g (0.34 m) 1,4-cyclohexanedimethanol (70% trans isomer),
40.9 g (0.66 m) ethylene glycol,
0.25 mL of a n-butanol solution of acetyl triisopropyl titanate containing 0.0075 g titanium,
1.42 mL of an ethylene glycol solution of Mn(OCOCH$_3$)$_2$.4H$_2$O containing 0.0068 g manganese, and
4.5 mL of an acetone solution containing 0.0004905 g (4 ppm) of 1-cyano-6-[4'-(2-hydroxyethyl) anilino]-3-methyl-3H-dibenzo [f,ij] isoquinoline-2,7-dione blue toner.

The ester interchange and polycondensation are carried out as in Example 3.

After the ester interchange reaction, the phosphate ester (A) described above is added in an amount to provide about 13-240 parts per million of phosphorus based on the final theoretical polymer weight to the reaction product, and the reaction product is polycondensed.

The resulting amorphous polymer is water clear with a desirable very light blue tint (the polyester prepared with no blue toner is yellow colored).

The resulting polymer has an inherent viscosity of 0.97. Gas chromatographic analyses of a hydrolyzed sample of the polyester show that the polyester contains 37 mol % ethylene glycol.

EXAMPLES 5-56

Employing the procedure of Example 3, poly(ethylene terephthalate) is copolymerized with 1,4-cyclohexanedimethanol and 4 ppm of the toner compounds described in Table 1 below. In each case, a polymer product of improved apparent whiteness is provided.

TABLE 1

| | Substituted 1-cyano-3H—dibenzo [f,ij] isoquinoline-2,7-diones | | | |
|---|---|---|---|---|
| Example No. | R | R$_1$ | R$_2$ | R$_3$ |
| 5 | C$_2$H$_5$ | H | 4'-C$_2$H$_4$OH | H |
| 6 | C$_6$H$_{11}$ | H | 3'-C$_2$H$_4$OH | H |
| 7 | C$_4$H$_9$—n | H | 2'-C$_2$H$_4$OH | H |
| 8 | C$_2$H$_4$OCH$_3$ | H | 4'-OC$_2$H$_4$OH | H |
| 9 | H | H | 4'-C$_2$H$_4$OH | H |
| 10 | CH$_2$C$_6$H$_5$ | H | 4'-SC$_2$H$_4$OH | H |
| 11 | CH$_2$C$_6$H$_{11}$ | H | 2'-SC$_2$H$_4$OH | H |
| 12 | CH$_2$CH$_2$OH | H | 3'-CO$_2$CH$_3$ | H |
| 13 | CH$_2$CH$_2$OCCH$_3$ (O) | H | 2'-COOH | H |

TABLE 1-continued

Substituted 1-cyano-3H—dibenzo [f,ij] isoquinoline-2,7-diones

| Example No. | R | R₁ | R₂ | R₃ |
|---|---|---|---|---|
| 14 | CH₃ | CH₃ | 4'-C₂H₄OH | H |
| 15 | CH₃ | Br | 4'-C₂H₄OCCH₃ ‖ O | H |
| 16 | CH₃ | OCH₃ | 4'-C₂H₄OCOC₂H₅ ‖ O | H |
| 17 | CH₃ | OC₆H₅ | 4'-OC₂H₄OCCH₃ ‖ O | H |
| 18 | CH₃ | SC₆H₅ | 4-OCH₂CH₂OCNHC₂H₅ ‖ O | H |
| 19 | CH₃ | S—⟨C₆H₄⟩—COOH | 4'-CH₃ | H |
| 20 | CH₃ | O—⟨C₆H₄⟩—COOH | H | H |
| 21 | CH₃ | —SCH₂CH₂OH | 4'-N(CO—CH₂—CH₂—CH₂) (morpholino-type) | H |
| 22 | CH₃ | —OC₂H₄OH | 3'-Cl | H |
| 23 | CH₃ | H | 2'-OCH₃—5'-CH₃ | H |
| 24 | CH₃ | H | 2',5'-diOCH₃ | H |
| 25 | CH₃ | H | 3'-CO₂C₂H₅ | H |
| 26 | CH₃ | H | 2'-OCH₃—5'-SO₂NHC₂H₄OH | H |
| 27 | CH₁ | H | 2'-OCH₃—5'-SO₂N(C₂H₄OH)₂ | H |
| 28 | CH₃ | H | 2'-OCH₃—5'-SO₂NH₂ | H |
| 29 | CH₃ | H | 2'-OCH₃—5'-SO₂NHC₂H₅ | H |
| 30 | CH₃ | H | 2'-OCH₃—5'-SO₂N(CH₃)C₆H₅ | H |
| 31 | CH₃ | H | 2'-OCH₃—5'-SO₂NHC₆N₁₁ | H |
| 32 | CH₃ | H | 2'-OCH₃—5'-SO₂NH—⟨C₆H₄⟩—CO₂CH₃ | H |
| 33 | CH₃ | H | 4'-O—⟨C₆H₄⟩—COOH | H |
| 34 | CH₃ | H | 2'-⟨C₆H₄⟩—COOH | H |
| 35 | CH₃ | H | 4'-S—⟨C₆H₄⟩—COOH | H |
| 36 | CH₃ | H | 4'-OCH₂—⟨C₆H₄⟩—CH₂OH | H |

TABLE 1-continued

Substituted 1-cyano-3H—dibenzo [f,ij] isoquinoline-2,7-diones

| Example No. | R | $R_1$ | $R_2$ | $R_3$ |
|---|---|---|---|---|
| 37 | $CH_3$ | H | 3'-$CH_2OH$ | H |
| 38 | $CH_3$ | H | 3'-$CHOHC_6H_5$ | H |
| 39 | $CH_3$ | H | 3',5'-di($CH_2OH$)—4'-$CH_3$ | H |
| 40 | $CH_3$ | H | 3',5'-di($CO_2CH_3$) | H |
| 41 | $CH_3$ | H | 4'-$NHCOCH_3$ | H |
| 42 | $CH_3$ | H | 4'-$NHCOC_6H_5$ | H |
| 43 | $CH_3$ | H | 4'-$NHSO_2CH_3$ | H |
| 44 | $CH_3$ | H | 4'-$NHCONHC_2H_5$ | H |
| 45 | $CH_3$ | H | 4'-$NHCOCH_2OH$ | H |
| 46 | $CH_3$ | H | 4'-Br | H |
| 47 | $CH_3$ | H | 4'-$C_6H_5$ | 8-$CH_3$ |
| 48 | $CH_3$ | H | 4'-$OC_6H_5$ | 9-Cl |
| 49 | $CH_3$ | H | 4'-$OCH_2$—⟨C_6H_4⟩—$CO_2CH_3$ | 11-$OCH_3$ |
| 50 | $CH_2CH=CH_2$ | H | 4'-$CO_2CH_2$—⟨C_6H_5⟩ | 9-$CH_3$ |
| 51 | $CH_2CH=CH_2$ | H | 4'-$OC_6H_{11}$ | H |
| 52 | $(CH_2)_5CH_3$ | H | 4'-$OC_2H_4OCNHC_6H_5$ (O=) | H |
| 53 | $CH_2CH(CH_3)_2$ | H | 4'-$C_2H_4OCC_6H_{11}$ (O=) | H |
| 54 | $CH_3$ | H | 3'-$CO_2C_6H_{11}$ | H |
| 55 | $CH_3$ | H | 3'-$CO_2CH_2C_6H_5$ | H |
| 56 | $CH_3$ | H | 4'-$C_2H_4OCN(C_2H_5)_2$ (O=) | H |

The invention has been described in detail with particular reference to preferred embodiments thereof, but it will be understood that variations and modifications can be effected within the spirit and scope of the invention.

We claim:

1. A composition comprising a molding or fiber grade polyester having added or reacted therein, in an amount sufficient to improve the apparent whiteness of the polyester, one or more compounds having the structure:

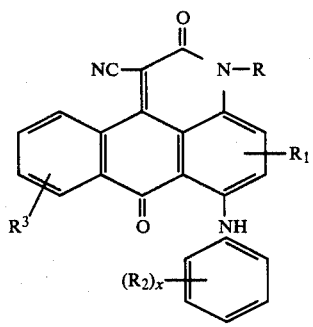

wherein
R is hydrogen, cycloalkyl, allyl, alkyl, aralkyl, alkoxyalkyl or cycloalkylalkylene;

$R_1$ is hydrogen, halogen, alkyl, alkoxy, aryloxy, alkylthio or arylthio;

$R_2$ is hydrogen, halogen, alkyl, aryl, alkoxy, aryloxy, alkylthio, arylthio, carbalkoxy, carbaryloxy, carbaralkoxy, carboxy, sulfamoyl, alkylsulfamoyl, dialkylsulfamoyl, alkylarylsulfamoyl, cycloalkylsulfamoyl, arylsulfamoyl, carbamoyl, alkylcarbamoyl, dialkylcarbamoyl, alkylarylcarbamoyl, cycloalkylcarbamoyl, arylcarbamoyl, 2-pyrrolidono, acylamido, or N-alkylacylamido;

$R_3$ is one or more residues selected from the group consisting of hydrogen, halogen, alkyl and alkoxy; and x is an integer of 1 to 5; wherein one or more of the alkyl, alkoxy, alkoxy, aryl, aryloxy, alkylthio, arylthio or aralkyl residues may contain one or more reactive groups selected from the group consisting of carboxy, carbalkoxy, carbaryloxy, N-alkyl-carbamoyloxy, carbamoyloxy, acyloxy, chlorocarbonyl, hydroxyl, cycloalkylcarbonyloxy, N-arylcarbamoyloxy and N,N-dialkylcarbamoyloxy and wherein said alkyl and aryl groups may contain substituents selected from the group consisting of alkoxy, acyloxy, cyano, hydroxy, halogen and acylamido.

2. A composition according to claim 1, wherein R is alkyl;
$R_1$ and $R_3$ are hydrogen; and R₂ contains at least one group selected from the group consisting of hydroxyl, acyloxy, carboxy, and carbalkoxy.

3. A composition according to claim 1, wherein
R is alkyl;
R₁ and R₃ are hydrogen; and
R₂ is one or more residues selected from the group consisting of hydrogen, lower alkyl, lower alkoxy, halogen and acylamido.

4. A composition according to claim 1. wherein
the toner is present in an amount of about 0.5 to about 10 ppm.

5. The composition of claim 1, wherein
the polymer is linear and thermoplastic, and has an I.V. of about 0.4 to about 1.2.

6. The composition of claim 2, wherein
the polymer is a polyester.

7. The composition of claim 2, wherein
the polymer is a polyester wherein the diol moiety is the residue of one or more of ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)tricyclo[5,2,1,0]-decane wherein x represents 3, 4, or 5, diethylene glycol, triethylene glycol, dipropylene glycol or tripropylene glycol, and wherein the acid moiety is the residue of one or more acids selected from the group consisting of terephthalic, isophthalic, 1,4-cyclohexanedicarboxylic, 1,3-cyclohexanedicarboxylic, succinic, glutaric, adipic, 1,12-dodecanedioic and naphthalene 2,6-dicarboxylic acids.

8. A polyester according to claim 5, wherein
the polymer is a polyester wherein the acid residue comprises at least 50 mol % of terephthalic acid, and
the diol residue comprises at least 50 mole % of ethylene glycol, 1,4-cyclohexanedimethanol or a mixture thereof.

9. A polyester according to claim 5, wherein
the diol includes up to about 50 mole % of ethylene glycol.

10. A process for the preparation of a film or fiber forming polyester of improved whiteness, said process comprising polymerizing at least one dibasic acid with at least one glycol in the presence of an esterification catalyst and the compound of claim 1, said compound being present in an amount sufficient to improve the whiteness of the resulting polyester.

11. A composition according to claim 1, wherein the compound copolymerized into the polyester is

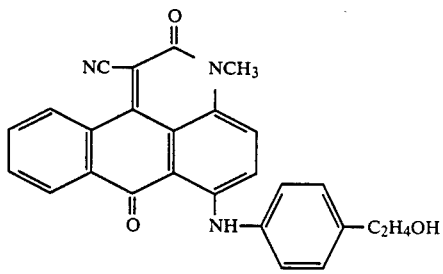

and
said compound is present in an amount of about 1 to about 5 ppm.

* * * * *